United States Patent
Mizoguchi (10) Patent No.: US 11,590,622 B2
(45) Date of Patent: Feb. 28, 2023

(54) THERMAL DISPLACEMENT COMPENSATION APPARATUS AND THERMAL DISPLACEMENT COMPENSATION METHOD FOR MACHINE TOOL

(71) Applicant: OKUMA CORPORATION, Niwa-Gun (JP)

(72) Inventor: Yuji Mizoguchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/644,355

(22) Filed: Dec. 15, 2021

(65) Prior Publication Data

US 2022/0226953 A1    Jul. 21, 2022

(30) Foreign Application Priority Data

Jan. 20, 2021   (JP) .............................. JP2021-007346

(51) Int. Cl.
| | |
|---|---|
| *B23Q 15/18* | (2006.01) |
| *B23Q 15/12* | (2006.01) |
| *G05B 19/404* | (2006.01) |
| *B23Q 17/09* | (2006.01) |

(52) U.S. Cl.
CPC ............ *B23Q 15/18* (2013.01); *B23Q 15/12* (2013.01); *B23Q 17/0985* (2013.01); *B23Q 17/0995* (2013.01); *G05B 19/404* (2013.01); *G05B 2219/49219* (2013.01)

(58) Field of Classification Search
None
See application file for complete search history.

(56) References Cited

U.S. PATENT DOCUMENTS

| | | | |
|---|---|---|---|
| 2018/0275629 A1 | 9/2018 | Watanabe | |
| 2021/0197303 A1* | 7/2021 | Takemoto | .............. B23H 11/00 |

FOREIGN PATENT DOCUMENTS

JP                6564412 B2        8/2019

* cited by examiner

*Primary Examiner* — Ryan A Jarrett
(74) *Attorney, Agent, or Firm* — Burr Patent Law, PLLC (57) ABSTRACT

A thermal displacement compensation apparatus includes a temperature measuring unit, a thermal displacement estimating unit, a thermal displacement compensation unit, a displacement measuring unit, a data recording unit, a thermal displacement compensation learning unit, and a displacement measurement timing diagnostic unit. The displacement measuring unit measures a displacement of a machine tool after compensating an axis command value. The thermal displacement compensation learning unit determines a thermal displacement estimation formula based on temperature information and the displacement recorded in the data recording unit. The displacement measurement timing diagnostic unit compares the temperature information at a past displacement measurement recorded in the data recording unit with current temperature information obtained from the temperature measuring unit, and determines whether to measure the displacement by the displacement measuring unit or not at a predetermined diagnosis timing.

8 Claims, 4 Drawing Sheets

```
THERMAL DISPLACEMENT COMPENSATION LEARNING SETTING

DISPLACEMENT MEASUREMENT TIMING
DURING OPERATION  [✓]  AT TOOL REPLACEMENT
                  [✓]  AT MAIN PROGRAM END
                  [ ]  AT Z-POSITION UPPER END

STANDBY STATE   [ 15 ]  MINUTES TIME INTERVAL

THRESHOLD
                   [ 1.0 ] °C
```

THERMAL DISPLACEMENT COMPENSATION APPARATUS AND THERMAL DISPLACEMENT COMPENSATION METHOD FOR MACHINE TOOL

BACKGROUND

This application claims the benefit of Japanese Patent Application Number 2021-007346 filed on Jan. 20, 2021, the entirety of which is incorporated by reference.

TECHNICAL FIELD

The disclosure relates to an apparatus and a method for improving an accuracy of thermal displacement compensation through an effective learning of a relation between a temperature and a displacement in a thermal displacement compensation of a machine tool in which a thermal displacement is estimated based on temperature information.

RELATED ART

When machining is performed using a machine tool, thermal distortion of each unit in the machine tool is caused by the influence of heat generation in machine by a main spindle and a feed axis operation, the temperature change in the installation environment of the machine tool, the temperature change of a coolant, and the like. Since the thermal displacement changes a relative position between a tool and a workpiece, the machining accuracy of the workpiece is degraded when the thermal displacement occurs in the machine tool during the machining.

As a method for reducing the thermal displacement in the machine tool, there has been an effective and widely used thermal displacement compensation in which a displacement amount is estimated from temperatures measured by temperature sensors installed to respective units of a structure of a machine tool, or operation conditions of a main spindle, a feed axis, or the like based on a preliminarily programmed thermal displacement estimation formula, and a movement amount of the axis is changed corresponding to the estimated displacement amount. However, in the thermal displacement compensation, the compensation is not performed well when the machining content or the operational environment changes, and parameters need to be adjusted in some cases. However, it is difficult for an operator to determine how to perform the adjustment.

As a solution for the issue, Japanese Patent No. 6564412 discloses a method in which a measured data group including temperatures or the like of respective units of a machine tool and actual measurement values of thermal displacement amount measured by a probe or the like are obtained, and a machine learning is performed using a combination of the data as teacher data, thereby obtaining a thermal displacement amount prediction calculation formula. Since the thermal displacement amount prediction calculation formula is obtained from the actual measurement data, the method using the machine learning has an advantage in that the thermal displacement compensation adjusted to the environment of using the machine tool is easily achieved. However, in the machine learning, generally, while the high accuracy is obtained for the learned data, an issue of overlearning in which the error increases for unlearned data easily occurs. To avoid the issue, Japanese Patent No. 6564412 employs a calculation method referred to as a regularized multiple regression analysis. While the error is reduced to minimum in the ordinary regression analysis, the calculation method adds a constraint condition to decrease a coefficient of the derived prediction formula, thereby allowing avoiding an issue in which a large coefficient is calculated and an error increases for an unknown input.

JP-A-2020-99982 discloses a method in which a thermal displacement estimation formula is represented by a sum of a preliminarily set basic thermal displacement estimation formula and an adjusted thermal displacement estimation formula set based on thermal displacement adjustment data, and a regularization parameter is used for a coefficient of the adjusted thermal displacement estimation formula to determine a thermal displacement estimation error and a magnitude of the coefficient of the adjusted thermal displacement estimation formula so as to be each decreased. Furthermore, the regularization parameter is determined from a magnitude of temperature change in the measurement and a magnitude of temperature change expected in an actual use, and the coefficient of the derived adjusted thermal displacement estimation formula is decreased when the temperature change in the measurement is small, thereby avoiding the overlearning.

However, the regularization methods used in Japanese Patent No. 6564412 and JP-A-2020-99982 act to decrease the coefficient of the derived thermal displacement prediction formula. Therefore, in an unlearned temperature environment, while the extremely increased error in the thermal displacement compensation caused by the overlearning can be avoided, the thermal displacement compensation amount becomes small relative to the actual thermal displacement in some cases. Therefore, the sufficient compensation effect is not provided, and the large thermal displacement compensation error still remains in some cases. In the learning of thermal displacement compensation, it is preferred that the unlearned temperature environment for the machine tool to be applied is reduced as much as possible.

Therefore, in consideration of the above-described issues, it is an object of the disclosure to provide a thermal displacement compensation apparatus and a then thermal displacement compensation method for machine tool allowing improving an accuracy of thermal displacement compensation through an effective learning of a relation between a temperature and a displacement in a thermal displacement compensation of a machine tool in which a thermal displacement is estimated based on temperature information.

SUMMARY

In order to achieve the above-described object, a thermal displacement compensation apparatus for machine tool according to a first aspect of the disclosure is provided. The thermal displacement compensation apparatus includes a temperature measuring unit, a thermal displacement estimating unit, a thermal displacement compensation unit, a displacement measuring unit, a data recording unit, a thermal displacement compensation learning unit, and a displacement measurement timing diagnostic unit. The temperature measuring unit measures temperatures of respective units of a machine tool. The thermal displacement estimating unit estimates a thermal displacement of the machine tool from the temperatures based on a preliminarily set thermal displacement estimation formula. The thermal displacement compensation unit compensates an axis command value based on the estimated thermal displacement. The displacement measuring unit measures a displacement of the machine tool after compensating the axis command value. The data recording unit records temperature information at the displacement measurement by the displacement measuring unit and the displacement. The thermal displacement compensation learning unit determines the thermal displacement estimation formula based on the temperature information and the displacement recorded in the data recording unit. The displacement measurement timing diagnostic unit compares the temperature information at a past displacement measurement recorded in the data recording unit with current temperature information obtained from the temperature measuring unit, and determines whether to measure the displacement by the displacement measuring unit or not at a predetermined diagnosis timing.

In another embodiment of the first aspect, which is in the above-described configuration, the displacement measurement timing diagnostic unit compares the temperature information at the displacement measurement one time before with the current temperature information, and determines whether to measure the displacement by the displacement measuring unit or not.

In another embodiment of the first aspect, which is in the above-described configuration, the displacement measurement timing diagnostic unit compares the temperature information at the respective past displacement measurements of twice or more with the current temperature information, and determines whether to measure the displacement by the displacement measuring unit or not.

In another embodiment of the first aspect, which is in the above-described configuration, the temperature information includes a temperature change rate at the displacement measurement by the displacement measuring unit.

In another embodiment of the first aspect, which is in the above-described configuration, the temperature information includes a temperature difference between the temperatures measured at a plurality of positions when the displacement is measured by the displacement measuring unit.

Another embodiment of the first aspect, which is in the above-described configuration, further includes a diagnosis timing setting unit that sets a time point of a command of a specific operation or a predetermined time interval as the predetermined diagnosis timing.

In another embodiment of the first aspect, which is in the above-described configuration, the diagnosis timing setting unit sets a time point at which at least one of the commands of a tool replacement, a main program end, and a movement to a Z-position upper end is executed as the predetermined diagnosis timing.

In order to achieve the above-described object, a thermal displacement compensation method for machine tool according to a second aspect of the disclosure is provided. The thermal displacement compensation method includes a temperature measuring step of measuring temperatures of respective units of a machine tool, a thermal displacement estimating step of estimating a thermal displacement of the machine tool from the temperatures based on a preliminarily set thermal displacement estimation formula, a thermal displacement compensation step of compensating an axis command value based on the estimated thermal displacement, a displacement measuring step of measuring a displacement of the machine tool after compensating the axis command value, a data recording step of recording temperature information at the displacement measurement in the displacement measuring step and the displacement, a thermal displacement compensation learning step of determining the thermal displacement estimation formula based on the temperature information and the displacement recorded in the data recording step, and a displacement measurement timing diagnostic step of comparing the temperature information at a past displacement measurement recorded in the data recording step with current temperature information obtained in the temperature measuring step, and determining whether to measure the displacement in the displacement measuring step or not at a predetermined diagnosis timing before the displacement measuring step.

According to the disclosure, the temperature information and the displacement at the displacement measurement are recorded, the recorded temperature information at the past displacement measurement is compared with the current temperature information at the predetermined diagnosis timing, and whether to measure the displacement or not is determined, thereby allowing the displacement measurement when the current temperature is unlearned. Accordingly, the relation between the temperature and the displacement can be effectively learned, thus allowing the improvement of the accuracy in the thermal displacement compensation.

According to another embodiment of the disclosure, by comparing the temperature information at the displacement measurement one time before with the current temperature information, whether to measure the displacement or not can be determined, thereby allowing determining whether to perform the measurement or not by a simple process.

According to another embodiment of the disclosure, by comparing the temperature information at the respective past displacement measurements of twice or more with the current temperature information, the displacement can be measured only in the unlearned case, thus allowing reduction of time loss by the displacement measurement to minimum.

According to another embodiment of the disclosure, by the use of the temperature change rate as the temperature information, whether the current temperature status is unlearned or not can be more accurately determined.

According to another embodiment of the disclosure, by the use of the temperature difference between the temperatures measured at a plurality of positions as the temperature information, whether the current temperature status is unlearned or not can be more accurately determined.

According to another embodiment of the disclosure, since the determination is made by comparing the temperatures at the command of the specific operation or predetermined time intervals, the displacement can be measured at the timing at which the original machining operation of the machine tool is not interfered as much as possible.

According to another embodiment of the disclosure, since the determination is made by comparing the temperatures when at least one of the commands of a tool replacement, a main program end, and a movement to a Z-position upper end is executed, the displacement can be measured at the timing at which the original machining operation of the machine tool is not interfered as much as possible.

DETAILED DESCRIPTION

The following describes embodiments of the disclosure based on the drawings.

Figure 1:
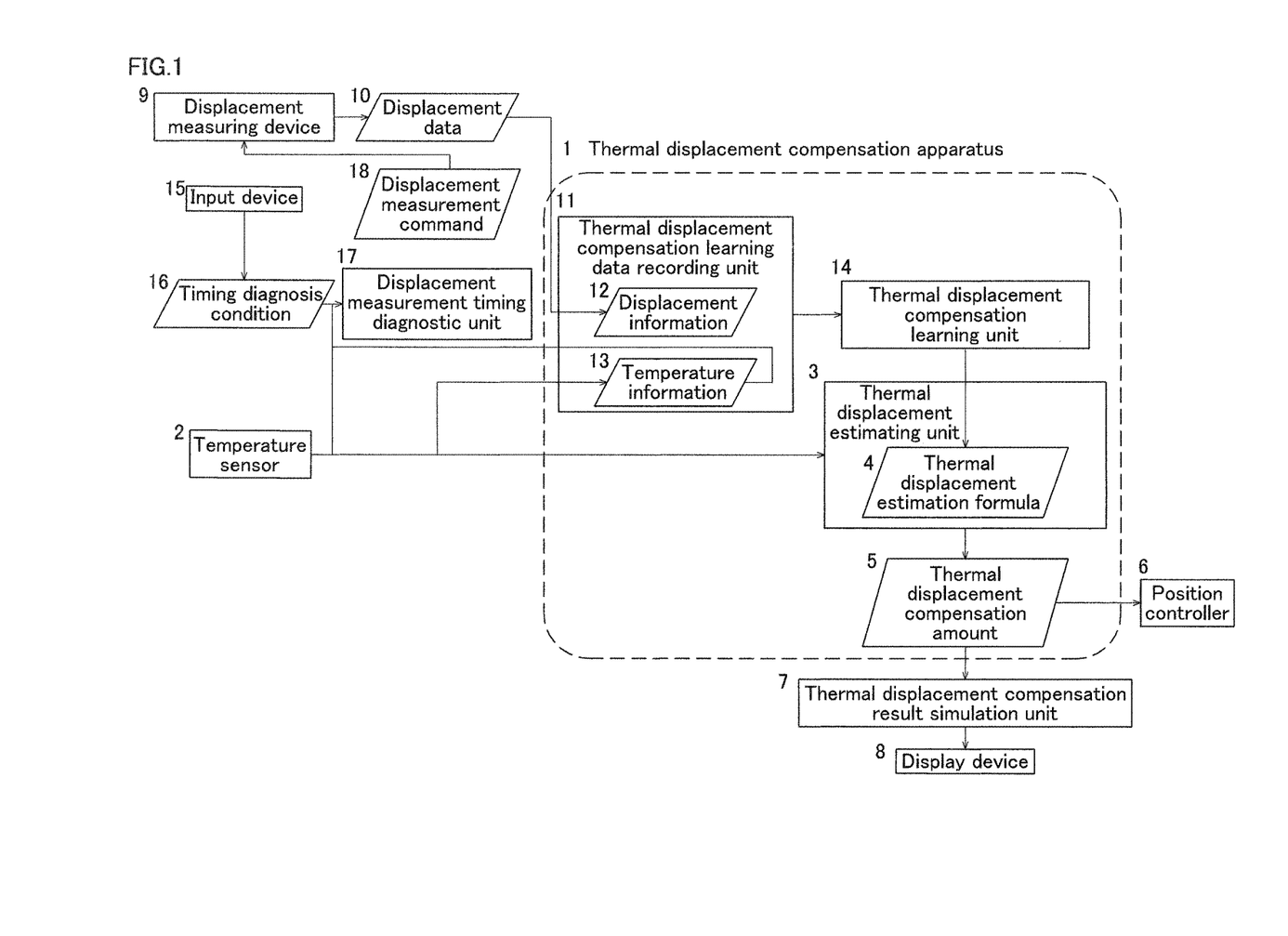
FIG. 1 is a block diagram of a thermal displacement compensation apparatus of a machine tool to which the disclosure is applied.

FIG. 1 is a block diagram of a thermal displacement compensation apparatus 1 of a machine tool to which the disclosure is applied.

In the thermal displacement compensation apparatus 1, a thermal displacement is estimated from information of temperature sensors 2 installed to a plurality of portions of the machine tool based on a thermal displacement estimation formula 4 by a thermal displacement estimating unit 3. A thermal displacement compensation amount 5 is output to a position controller 6 based on the estimated thermal displacement, and an axis is moved corresponding to the thermal displacement compensation amount 5, thereby executing the compensation. Usually, the thermal displacement estimation formula is set for each axis, and in a case of a three-axis machining center, the thermal displacement estimation formula is set for each of an X-axis, a Y-axis, and a Z-axis. It can be said that the above is a minimum configuration for ensuring the thermal displacement compensation.

In the actual configuration, for visualizing a result of the thermal displacement compensation, a thermal displacement compensation result simulation unit 7 simulates how the thermal displacement is reduced by the thermal displacement compensation, and outputs it to a display device 8 in some cases. Furthermore, a displacement measuring device 9 is disposed to obtain displacement data 10, and the displacement data 10 is saved in a thermal displacement compensation learning data recording unit 11 as displacement information 12. Here, the displacement measuring device 9 may, for example, measure certain points on a table by a position measurement sensor, such as a touch trigger probe, attached to a main spindle of the machine tool. Alternatively, the measurement may be performed by attaching a displacement sensor to the table side and bringing the main spindle close to the displacement sensor. In the thermal displacement compensation learning data recording unit 11, the temperature measured by the temperature sensor 2 is saved as temperature information 13 in addition to the displacement information 12. A thermal displacement compensation learning unit 14 determines an additional thermal displacement estimation formula 4 through a learning based on the data saved in the thermal displacement compensation learning data recording unit 11.

As described above, a technique for achieving a further effective thermal displacement compensation by optimizing the thermal displacement estimation formula through the learning is present as the related art. However, in the related art, a timing of measuring the displacement data 10 by the displacement measuring device 9 is not specifically considered. As a common method for use, a method in which the measurement is performed at constant time intervals to accumulate displacement information is considered. Machine tool manufacturers conduct tests by variously changing operation conditions of machines and room temperatures of environments where the machines are installed, measure the displacement at constant time intervals during the tests, and collect learning data for thermal displacement compensation at various temperature changes of the machines. When the machine tool manufacturers collect the learning data for thermal displacement compensation, the learning data with sufficiently high quality can be obtained by the related art.

However, when a user attempts to collect the learning data for thermal displacement compensation during the use of the machine, the effective data is possibly not collected. For example, when the user executes a command of measuring the displacement in the same time slot every day, it is considered that only the data of similar temperature environment is collected. The learning of the thermal displacement estimation formula based on the biased data causes an issue of overlearning and the like, and makes the effective thermal displacement compensation difficult to be performed.

Therefore, in the disclosure, for the effective and highly stable learning of the thermal displacement estimation formula, a configuration below is added.

An input device 15 is configured to set a timing diagnosis condition 16. At a timing that matches the content set in the timing diagnosis condition 16, a displacement measurement timing diagnostic unit 17 compares the current temperature obtained from the temperature sensor 2 with the past temperature recorded as the temperature information 13, and diagnoses whether to measure the displacement or not. When the measurement is diagnosed to be necessary, a displacement measurement command 18 is output. Accordingly, the displacement measuring device 9 can obtain the displacement data 10 at a more appropriate timing.

Figure 2:
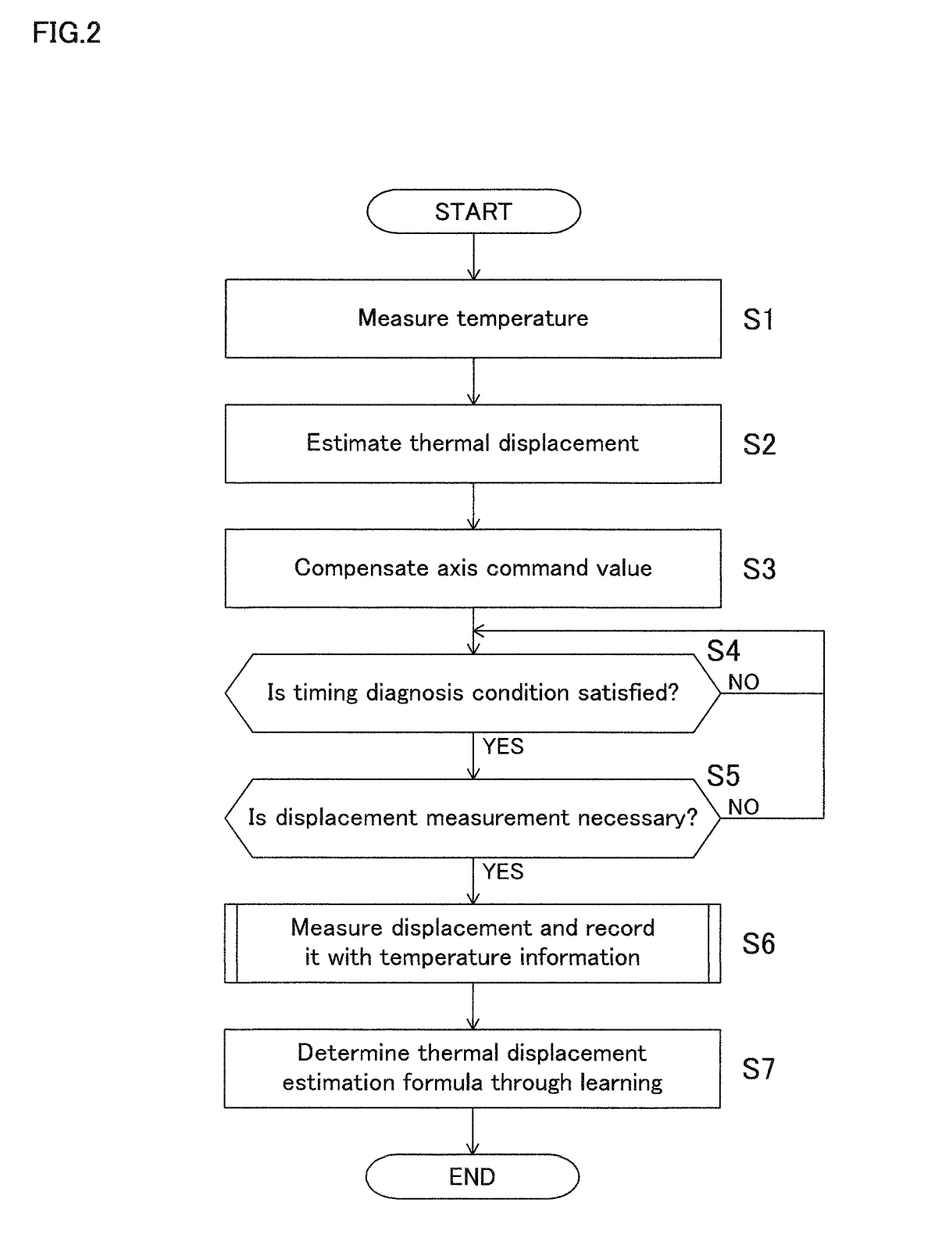
FIG. 2 is a flowchart of a thermal displacement compensation method.

In the disclosure, the thermal displacement compensation method by the thermal displacement compensation apparatus 1 is executed based on the flowchart of FIG. 2.

First, at S1, the temperature sensor 2 measures the temperatures of respective units in the machine tool (temperature measuring step).

Next, at S2, the thermal displacement estimating unit 3 estimates the thermal displacement from the information obtained from the temperature sensor 2 based on the thermal displacement estimation formula 4 (thermal displacement estimating step).

Next, at S3, the position controller 6 compensates command values of respective axes based on the thermal displacement compensation amount 5 output from the thermal displacement estimating unit 3 (thermal displacement compensation step).

Then, at S4, the displacement measurement timing diagnostic unit 17 determines whether the timing diagnosis condition is satisfied or not (whether it is a timing to measure the displacement or not) (displacement measurement timing diagnostic step).

When the timing diagnosis condition is determined to be satisfied at S4, whether the displacement needs to be measured or not is determined at S5. When the displacement measurement is not necessary, the process returns to S4.

When the displacement measurement is determined to be necessary at S5, the displacement measuring device 9 measures the displacement, obtains the displacement data 10, and records the displacement data 10 as the displacement information 12 in the thermal displacement compensation learning data recording unit 11 at S6 (displacement measuring step). At the same time, the temperature data obtained by the temperature sensor 2 is recorded in the thermal displacement compensation learning data recording unit 11 as the temperature information 13 (data recording step).

Then, at S7, the thermal displacement compensation learning unit 14 determines the additional thermal displacement estimation formula 4 through the learning based on the displacement information 12 and the temperature information 13 saved in the thermal displacement compensation learning data recording unit 11, and causes the thermal displacement estimating unit 3 to update the thermal displacement estimation formula 4 (thermal displacement compensation learning step).

Figure 3:
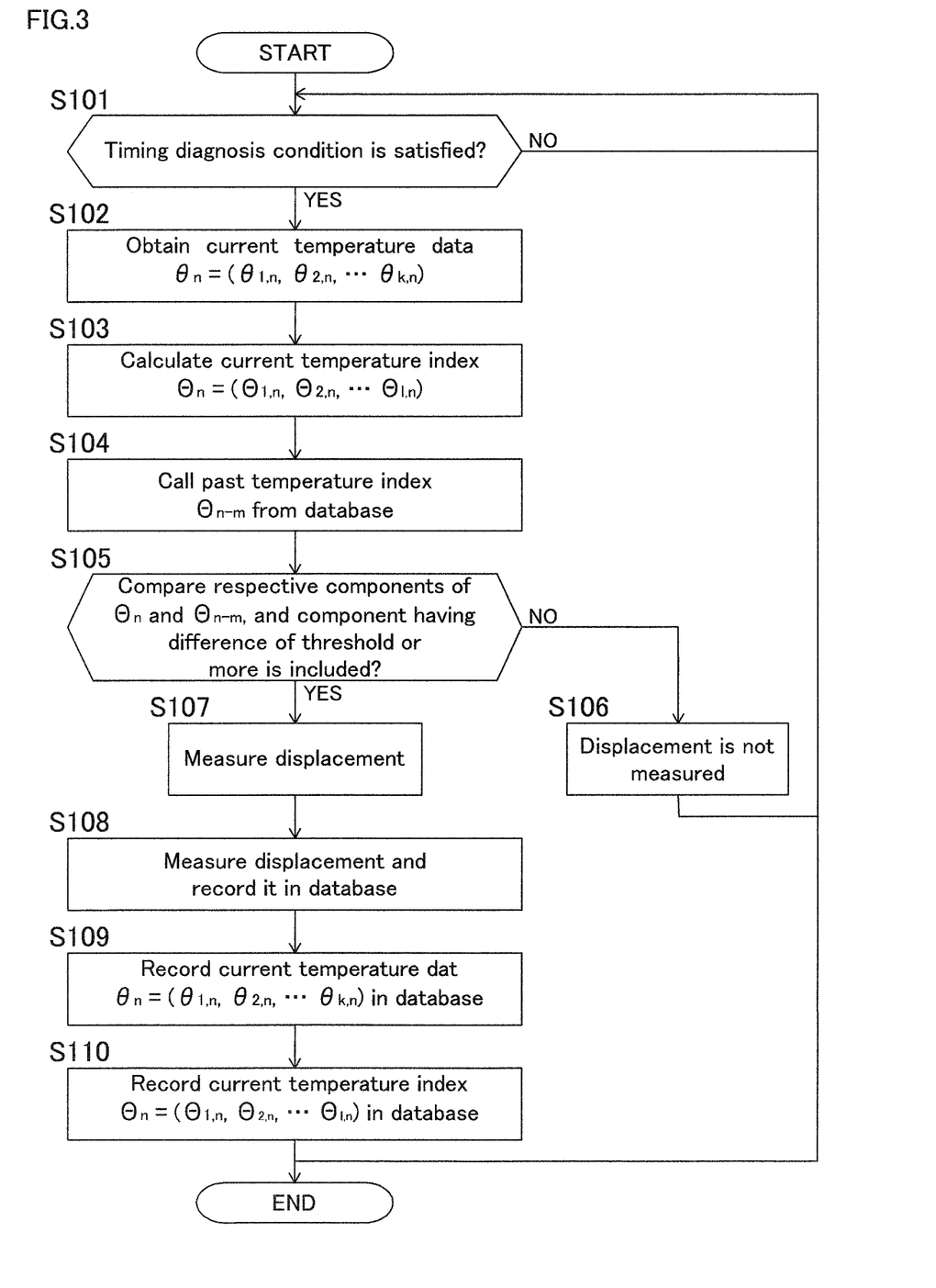
FIG. 3 is a flowchart of a process of performing a displacement measurement timing diagnosis.

Next, the process from the displacement measurement timing diagnosis to the recording of the displacement and the temperature information in FIG. 2 (process from S4 to S6) will be described in detail using the flowchart of FIG. 3.

Figure 4:
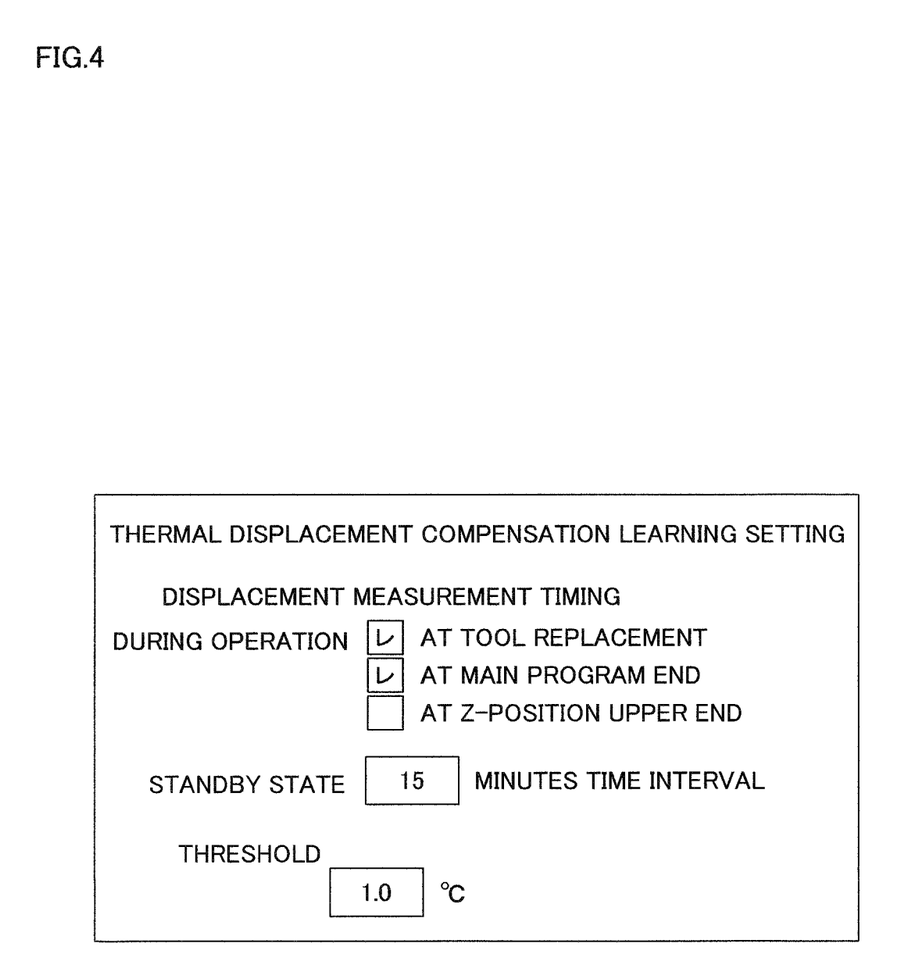
FIG. 4 illustrates an exemplary screen for setting a timing diagnosis condition.

First, the timing diagnosis condition determined at S101 (S4 of FIG. 2) can be set in a screen, for example, as illustrated in FIG. 4 by the input device 15. In the example of FIG. 4, during the operation, the command of specific operation as the condition, such as "at tool replacement", "at main program end", and "at Z-position upper end" can be selected. Meanwhile, in a standby state, the setting can be made at constant time intervals. In the example of FIG. 4, the setting is made as every 15 minutes. When the timing diagnosis condition is satisfied, the diagnosis process of whether to measure the displacement or not is started. Accordingly, the displacement can be measured at the timing at which the original machining operation of the machine tool is not interfered as much as possible.

Next, at S102, the current temperature data $\theta_n=(\theta_{1,n}, \theta_{2,n}, \ldots, \theta_{k,n})$ is obtained. Hereinafter, k pieces of the temperature data is expressed as $\theta=(\theta_1, \theta_2, \ldots \theta_k)$, and the temperature data obtained at n-th times after the process start is expressed as $\theta_n=(\theta_{1,n}, \theta_{2,n}, \ldots, \theta_{k,n})$.

Next, at S103, a current temperature index $\Theta_n=(\Theta_{1,n}, \Theta_{2,n}, \Theta_{l,n})$ is calculated as the temperature information. The temperature index is obtained by performing a calculation process to the obtained temperature data, and the temperature index is expressed by $\Theta$ (upper-case theta) while the original temperature data is expressed by $\theta$ (lower-case theta). The calculation process, for example, takes an average of a plurality of temperatures, or obtains a difference between two temperatures. Furthermore, a change rate may be calculated by differential processing, and delay processing may be performed using a filter. A plurality of the temperature indices may be calculated. For example, in the case of the l temperature indices, the temperature index is expressed as $\Theta_n=(\Theta_{1,n}, \Theta_{2,n}, \ldots \Theta_{l,n})$.

Next, at S104, a past temperature index $\Theta_{n-m}$ is called from the database (thermal displacement compensation learning data recording unit 11 of FIG. 1), and subsequently, at S105, respective components of $\Theta_n$ and $\Theta_{n-m}$ are compared, and it is determined whether the components each having the difference of a threshold $A_1$ or more are included like the formula 1 below or not. When the current process is assumed as the n-th process, $\Theta_{n-m}$ indicates the temperature index at the point m times before. The process may be performed for m=1, that is, only for one time before, or the comparison may be performed for m=1, 2, ..., n−1, that is, all of the past temperature indices. The comparison is performed for all of the l temperature indices.

[Math. 1]

$|\Theta_{1,n} - \Theta_{1,n-1}| \geq A_1$ or $|\Theta_{1,n} - \Theta_{1,n-2}| \geq$ (Formula 1)

$A_1$ or ... or $|\Theta_{1,n} - \Theta_{1,n-m}| \geq A_1$ or $|\Theta_{2,n} - \Theta_{2,n-1}| \geq A_2$ or $|\Theta_{2,n} - \Theta_{2,n-2}| \geq$ $A_2$ or ... or $|\Theta_{2,n} - \Theta_{2,n-m}| \geq A_2$ ...

$|\Theta_{1,n} - \Theta_{1,n-1}| \geq A_1$ or $|\Theta_{1,n} - \Theta_{1,n-2}| \geq$ $A_1$ or ... or $|\Theta_{1,n} - \Theta_{1,n-m}| \geq A_1$ $A_1$: threshold relative to component 1 of temperature index Satisfying the condition of the formula 1 means that the obtained current temperature is different from the recorded past temperature, that is, the current temperature is an unlearned temperature for the thermal displacement compensation apparatus 1 of the machine tool. When even one difference is larger than the threshold $A_1$ in the formula 1, the process proceeds to S107, and the displacement is determined to be measured. When there is no difference larger than the threshold $A_1$, the process proceeds to S106, and the displacement is determined not to be measured. S102 to S107 corresponds to S5 of FIG. 2.

As illustrated in FIG. 4, the threshold $A_1$ used for the determination in the formula 1 may be set in the screen.

The formula 1 is an exemplary method for comparison between the current temperature information and the past temperature information, and the comparison may be performed based on another formula. For example, instead of the determination by obtaining the differences for the respective components of the temperature indices, the determination may be made with the sum of the magnitudes of the respective differences.

When the displacement is determined to be measured at S107, the process further proceeds to S108, and the displacement is measured and recorded in the database. Furthermore, the current temperature data $\theta_n=(\theta_{1,n}, \theta_{2,n}, \ldots, \theta_{k,n})$ is recorded in the database at S109, and the current temperature index $\Theta_n=(\Theta_{1,n}, \Theta_{2,n}, \ldots \Theta_{l,n})$ is recorded at S110. S108 to S110 corresponds to S6 of FIG. 2.

The thermal displacement compensation apparatus 1 and the thermal displacement compensation method of the above-described embodiment execute the process of S1 to S7 while including the temperature sensor 2 (temperature measuring unit), the thermal displacement estimating unit 3 (thermal displacement estimating unit), the position controller 6 (thermal displacement compensation unit), the displacement measuring device 9 (displacement measuring unit), the thermal displacement compensation learning data recording unit 11 (data recording unit), and the thermal displacement compensation learning unit 14 (thermal displacement compensation learning unit). The temperature sensor 2 (temperature measuring unit) measures the temperatures of the respective units of the machine tool. The thermal displacement estimating unit 3 (thermal displacement estimating unit) estimates the thermal displacement compensation amount 5 (thermal displacement) of the machine tool from the temperatures based on the preliminarily set thermal displacement estimation formula 4. The position controller 6 (thermal displacement compensation unit) compensates the axis command value based on the estimated thermal displacement compensation amount 5. The displacement measuring device 9 (displacement measuring unit) measures the displacement of the machine tool after compensating the axis command value. The thermal displacement compensation learning data recording unit 11 (data recording unit) records the temperature information 13 at the displacement measurement by the displacement measuring device 9 and the displacement information 12 (displacement). The thermal displacement compensation learning unit 14 (thermal displacement compensation learning unit) determines the thermal displacement estimation formula 4 based on the temperature information 13 and the displacement information 12 recorded in the thermal displacement compensation learning data recording unit 11.

Further, the displacement measurement timing diagnostic unit 17 (displacement measurement timing diagnostic unit) is provided. At the predetermined diagnosis timing determined at S4, the displacement measurement timing diagnostic unit 17 (displacement measurement timing diagnostic unit) compares the temperature information 13 at a past displacement measurement recorded in the thermal displacement compensation learning data recording unit 11 with current temperature information 13 obtained from the temperature sensor 2, and determines whether to measure the displacement by the displacement measuring device 9 or not.

Thus, according to the disclosure, the temperature information 13 and the displacement information 12 at the displacement measurement are recorded, the recorded temperature information 13 at the past displacement measurement is compared with the current temperature information 13 at the predetermined diagnosis timing, and whether to measure the displacement or not is determined, thereby allowing the displacement measurement when the current temperature is unlearned. Accordingly, the relation between the temperature and the displacement can be effectively learned, thus allowing the improvement of the accuracy in the thermal displacement compensation.

Especially, in the determination of whether to measure the displacement or not, by comparing the temperature information at the displacement measurement one time before with the current temperature information (S104), whether to perform the measurement or not can be determined by a simple process.

By comparing the temperature information at the respective past displacement measurements of twice or more with the current temperature information (S104), the displacement can be measured only in the unlearned case, thus allowing reduction of time loss by the displacement measurement to minimum.

By the use of the temperature change rate as the temperature information (S103), whether the current temperature status is unlearned or not can be more accurately determined.

By the use of the temperature difference between the temperatures measured at a plurality of positions as the temperature information (S103), whether the current temperature status is unlearned or not can be more accurately determined.

Meanwhile, with the input device 15 (diagnosis timing setting unit) configured to set the time point of the command of the specific operation or a certain time interval as the predetermined diagnosis timing, the displacement can be measured at the timing at which the original machining operation of the machine tool is not interfered as much as possible. Especially, when the determination is made by comparing the temperatures when at least one of the commands of the tool replacement, the main program end, and the movement to the Z-position upper end is executed (FIG. 4), the displacement can be measured at the timing at which the original machining operation of the machine tool is not interfered as much as possible.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A thermal displacement compensation apparatus for machine tool, comprising:
    a temperature measuring unit that measures temperatures of respective units of a machine tool;
    a thermal displacement estimating unit that estimates a thermal displacement of the machine tool from the temperatures based on a preliminarily set thermal displacement estimation formula;
    a thermal displacement compensation unit that compensates an axis command value based on the estimated thermal displacement;
    a displacement measuring unit that measures a displacement of the machine tool after compensating the axis command value;
    a data recording unit that records temperature information at the displacement measurement by the displacement measuring unit and the displacement;
    a thermal displacement compensation learning unit that determines the thermal displacement estimation formula based on the temperature information and the displacement recorded in the data recording unit; and
    a displacement measurement timing diagnostic unit that compares the temperature information at a past displacement measurement recorded in the data recording unit with current temperature information obtained from the temperature measuring unit, and determines whether to measure the displacement by the displacement measuring unit or not at a predetermined diagnosis timing.

2. The thermal displacement compensation apparatus for machine tool according to claim 1, wherein
    the displacement measurement timing diagnostic unit compares the temperature information at the displacement measurement one time before with the current temperature information, and determines whether to measure the displacement by the displacement measuring unit or not.

3. The thermal displacement compensation apparatus for machine tool according to claim 1, wherein
    the displacement measurement timing diagnostic unit compares the temperature information at the respective past displacement measurements of twice or more with the current temperature information, and determines whether to measure the displacement by the displacement measuring unit or not.

4. The thermal displacement compensation apparatus for machine tool according to claim 1, wherein
    the temperature information includes a temperature change rate at the displacement measurement by the displacement measuring unit.

5. The thermal displacement compensation apparatus for machine tool according to claim 1, wherein
    the temperature information includes a temperature difference between the temperatures measured at a plurality of positions when the displacement is measured by the displacement measuring unit.

6. The thermal displacement compensation apparatus for machine tool according to claim 1, further comprising
    a diagnosis timing setting unit that sets a time point of a command of a specific operation or a predetermined time interval as the predetermined diagnosis timing.

7. The thermal displacement compensation apparatus for machine tool according to claim 6, wherein
    the diagnosis timing setting unit sets a time point at which at least one of the commands of a tool replacement, a main program end, and a movement to a Z-position upper end is executed as the predetermined diagnosis timing.

8. A thermal displacement compensation method for machine tool, comprising:
measuring temperatures of respective units of a machine tool;
estimating a thermal displacement of the machine tool from the temperatures based on a preliminarily set thermal displacement estimation formula;
compensating an axis command value based on the estimated thermal displacement;
measuring a displacement of the machine tool after compensating the axis command value;
recording temperature information at the displacement measurement in the measuring of the displacement and the displacement;
determining the thermal displacement estimation formula based on the temperature information and the displacement recorded in the recording; and
comparing the temperature information at a past displacement measurement recorded in the recording with current temperature information obtained in the measuring of the temperatures, and determining whether to measure the displacement in the measuring of the displacement or not at a predetermined diagnosis timing before the measuring of the displacement.

* * * * *